(12) United States Patent
Seelig et al.

(10) Patent No.: US 7,006,608 B2
(45) Date of Patent: *Feb. 28, 2006

(54) SOFTWARE ALGORITHM AND METHOD ENABLING MESSAGE PRESENTATION DURING A TELEPHONE RINGING SIGNAL PERIOD

(76) Inventors: Karl Seelig, 2081 Business Center Dr. Suite 195, Irvine, CA (US) 92612;
Anita Erickson, 2081 Business Center Dr. Suite 195, Irvine, CA (US) 92612

( * ) Notice: Subject to any disclaimer, the term of this patent is extended or adjusted under 35 U.S.C. 154(b) by 196 days.

This patent is subject to a terminal disclaimer.

(21) Appl. No.: 10/185,937

(22) Filed: Jun. 28, 2002

(65) Prior Publication Data

US 2003/0002657 A1  Jan. 2, 2003

Related U.S. Application Data

(63) Continuation-in-part of application No. 10/121,626, filed on Apr. 11, 2002.

(60) Provisional application No. 60/301,760, filed on Jun. 28, 2001.

(51) Int. Cl.
*H04M 1/64* (2006.01)

(52) U.S. Cl. .............................. 379/88.22; 379/114.13; 379/88.25

(58) Field of Classification Search ........... 379/373.01, 379/114.01, 114.03, 114.12, 114.13, 88.12, 379/88.25, 142.01
See application file for complete search history.

(56) References Cited

U.S. PATENT DOCUMENTS

| | | | |
|---|---|---|---|
| 5,321,740 A * | 6/1994 | Gregorek et al. ........ | 379/93.17 |
| 2003/0086558 A1 * | 5/2003 | Seelig et al. ........... | 379/373.01 |

* cited by examiner

*Primary Examiner*—Jefferey F. Harold
(74) *Attorney, Agent, or Firm*—Robert J. Schaap

(57) ABSTRACT

A software based algorithm and associated method for generating and delivering to a caller or a recipient, or both, a message generated over a telephone link during a normal telephone ringing signal period. The software based algorithm and method is operable with hardware designed to accomplish this purpose, and is also effective for use with hard wire based telephone systems and cellular telephone systems. The algorithm and method operate on the basis of identifying a caller, introducing and playing a message and terminating the play of the message when a recipient answers a recipient telephone.

35 Claims, 8 Drawing Sheets

SOFTWARE ALGORITHM AND METHOD ENABLING MESSAGE PRESENTATION DURING A TELEPHONE RINGING SIGNAL PERIOD

RELATED APPLICATIONS

This application is based on and claims priority from a provisional patent application Ser. No. 60/301,760 dated Jun. 28, 2001, for "Algorithm for Operating a Promotion Generating Telecommunications System", and is also a continuation-in-part of our co-pending U.S. patent application Ser. No. 10/121,626, filed Apr. 11, 2002, for "Telecommunication System Using Message Presentation During a Ringing Signal Period."

BACKGROUND OF THE INVENTION

1. Field of the Invention

This invention relates in general to certain new and useful improvements in algorithms and associated methods for operating a telecommunications system in which a message is generated during a ringing or ring-back signal period, at least until such time as the recipient telephone is unhooked or answered, and more particularly, to an algorithm and associated method which allow for the generation and presentation of promotional or advertising messages, or other messages specifically addressed to the caller or a recipient, or both, during a normal ringing cycle in a telephone system.

2. Brief Description of Related Art

In most telephone systems throughout the world, initiation of a telephone call is achieved by a caller introducing a dialing signal through actuation of a rotary dialer or a push-button tone generator at his or telephone and that dial tone or voltage is then used and/or received by a telephone switching station, e.g., the caller's switching station, which selects the telephone corresponding to a dialed or inserted telephone number. Thus, if a caller dials a certain telephone number, the switching station automatically sends that telephone call to that certain telephone number. At that point in time, a ringing signal is generated, which is a signal other than a voice communication signal, and is effectively initiated by the telephone switching station.

The ringing signal causes the telephone at a particular location to generate a telephone advisory message which is usually audible (or visual in the case of telephones for the hearing impaired), so that the recipient knows that a caller is waiting to communicate with the recipient. The vast majority of telecommunication systems which are presently in operation, and particularly public and private telephone systems, use some type of ringing signal to inform a receiver or recipient of an intended message that a caller is attempting to access the recipient of the telephone call. Thus, if a telephone communication is initiated to a particular residence, the telephone in the occupants of that residence will hear a ringing signal advising the occupants of the intended call. When the recipient picks up the telephone handset or effectively unhooks the telephone, a message path is completed.

Although a ringing signal is generated at the residence or other location to which the telephone call is directed, a similar ringing signal, referred to as a "ring-back" signal, is heard also in the telephone of the caller. This is accomplished again, through a telephone switching station associated with that caller, or otherwise, the recipient's telephone switching station, so that the caller may hear that ring-back signal, which mimics the ringing signal and recognize that the telephone of the intended recipient is also ringing.

There is, by telephone system design, a delay which arises between the completion of a dialing process and the initiation of a first ring of a ringing sequence. Although that time period may be short, perhaps no more than four to six seconds, depending upon the particular telephone system, that time is merely a wasted time period in which the caller must await an initiation of a ringing signal. However, most callers immediately become accustomed to the fact that there is a time delay, and hence this time delay is expected with little or no consideration being given to that delay. In addition to the foregoing, most telephone systems also use a quiescent time period between each of the ringing signals in a ringing signal sequence. Thus, a fair interval of time exists between the initiation of a telephone call and the actual time that a recipient answers that telephone call by unhooking or activating his or her telephone system.

In our aforesaid U.S. patent application Ser. No. 10/121, 626 filed Apr. 11, 2002, for Telecommunication System Using Message Presentation During a Ringing Signal Period, there was presented an entire hardware system for allowing the substitution of, or at least the interposition of, a message during the normal ringing cycle period, or so-called "quiescent period". Inasmuch as the normal telephone systems, and for that matter, the hardware associated with these telephone systems which allow for message presentation, is computer or processor operated, it is necessary to provide a software based algorithm for operation of that computer or processor. The hardware in the aforesaid utility patent application, along with the operating algorithm described herein, allows for the presentation of an advertising or promotional message, or for that matter, other message, targeted to, that is, limited to, the caller or the recipient, or both, during an entire ringing cycle, or otherwise, a portion of that ringing cycle.

It can be observed, in accordance with the invention, that the delivery of a message to, for example, a calling party or so-called "caller", is particularly advantageous for an organization which is contacted by that caller, and where the organization wishes to present or promote its products or services via telephone advertising or promotion. Nevertheless, and while the system of the invention and the associated software based algorithm and method, is directed to largely presenting the advertising or promotional message to the callers, it is also possible to direct that message to the party being called, or so-called "recipient", or otherwise, to both parties.

It can be recognized that the generation of a message, in the nature of an advertising or promotional message, can be advantageous for a consumer in that information about a product or service can be given during that ringing signal period. Moreover, use of this system can result in lower cost telephone service for the consumer attempting to initiate contact with a business organization.

The concept of applying an advertising or promotional message to a telephone communication link has been proposed in U.S. Pat. No. 4,811,382 dated Mar. 7, 1989, to Neal Sleevi. The Sleevi patent, however, is specifically limited to a land based or so-called hard-wired network and does not include more modern forms of telecommunication which have become available since the time of the Sleevi patent. Moreover, Sleevi did not envision the selective selection of messages depending upon a particular caller and which selected message was designed to conform to or meet the purchasing information or other criteria of a particular customer. Thus, Sleevi was deficient in this regard, as well as in other areas.

U.S. patent application Publication No. US 2001/0051517 A1, published on Dec. 13, 2001, to Jonathan Streitzel identifies a telecommunications advertising system in which advertising or promotional data is not limited only to a land based system, but also includes a wireless or cellular communication system. However, the Streitzel publication based on U.S. patent application Ser. No. 09/753,415, filed Jan. 2, 2001, similarly suffers a number of disadvantages. Although Streitzel does provide for advertising and promotional messages used in a cellular communication, it does so with several limitations not necessarily overcome by the Sleevi patent.

There are also several commercially operating telephone companies forming part of the Bell system, which generate messages before the ringing signal. Thus, for example, the telephone organization may offer a message to the effect that this telephone call is brought by "Coastal Bell". However, that message is generated with the use of a time delay before the actual ringing signal is initiated. In effect, it does not replace any or a portion of the ring-back signal, or for that matter, the ringing signal.

In each of the aforesaid Sleevi patent, and aforesaid publication to Jonathan Streitzel, there is no algorithm or software proposed for operating the telephone system. Thus, Streitzel and Sleevi both propose hardware based systems, but no software to operate those systems. As indicated previously, inasmuch as all modern telephone systems are now computer or processor operated, it is necessary to employ software based processors or computers in conjunction with the substitution of, or the interposition of, a message during a ringing signal.

In addition to the foregoing, neither of the aforesaid Sleevi patent or the publication of Streitzel, provided for any capability of continuously changing that message or for updating a message, or for that matter, even generating new messages without contacting the telephone switching station. In addition, neither provided for a software based system in which a message could be generated directly from the telephone itself, such as a cellular telephone, without the need for the telephone company switching station. In effect, a subscriber company which provides for the use of an advertising or promotional message, could use its own PBX or other system to provide the switching and for the generation of the message directly at the telephone of a user. In this way, messages could be continuously updated via wireless signals.

It would therefore be desirable to provide a software based algorithm for operation of a telecommunication system in which an advertising or promotional message could be generated over a telephone communication link and delivered in the time between or in place of a ringing signal sequence.

OBJECTS OF THE INVENTION

It is, therefore, one of the primary objects of the present invention to provide a software based algorithm which operates with a computer or processor, in order to allow an advertising or promotional message to be generated over a telephone link during a quiescent period, which occurs during a ringing signal sequence.

It is another object of the present invention to provide a software based algorithm of the type stated, in which advertising or promotional messages can be either overlaid upon, or substituted for, a portion of, or all of a ringing signal (including a ring-back signal) sequence.

It is a further object of the present invention to provide a software based algorithm, which is operable with both hard wired telephone systems and cellular telephone systems.

It is an additional object of the present invention to provide a software based algorithm of the type stated, in which a subscriber station can be adapted to provide the necessary telephone switching sequencing, and also to thereby allow for generation of prerecorded messages to a caller or a recipient of a phone call, or both.

It is also an object of the present invention to provide a software based algorithm for use with a hardware arrangement, designed to provide advertising or promotional messages, or other messages, over a telephone communication system, and which software algorithm eliminates need for a substantial amount of hardware which might otherwise be required.

It is a salient object of the present invention to provide a method of generating advertising or promotional messages over a telephone communication link, using a software based algorithm for enabling the placing or overlaying of a message upon a portion, or all, of a ringing signal during a normal ringing signal sequence.

It is still a further object of the present invention to provide a method of automatically updating messages which can be generated to callers or recipients, or both, when a caller contacts a recipient over a normal telephone communication link.

It is still another object of the present invention to provide a software based algorithm of the type stated, which allows for transmission and retention of information at a remote source which can be used for selecting and generating messages to be presented to a recipient or a caller in a telephone communication link.

With the above and other objects in view, our invention resides in the novel features of form, arrangement of steps, and combinations thereof, presently described and pointed out in the algorithms as described in the following claims.

BRIEF SUMMARY OF THE INVENTION

The present invention primarily relates to one or more software based algorithms, setting forth a plurality of steps which allow for generation of software to operate a telephone communication system, in such manner sound presentations, e.g. that messages can be presented during a portion of, or the entire, ringing signal period, or so-called "quiescent period". In this case, and in a broad aspect, a caller or recipient of a phone call, or both, will be able to hear one or more messages in place of, or overlaid upon, a ringing signal, all as hereinafter described in more detail. Even more specifically, the software based algorithm of the invention provides for the prerecording and generation of messages over a telephone communication link, for creating advertising and promotion during this normal quiescent period.

In a normal telephone communication, a caller initiates a telephone call to a recipient, and that recipient typically answers the telephone call. Thus, and in that respect, the telephone communication is a two-way communication. In that case, the party who picks up the telephone and responds to a caller, is identified herein as a "recipient". In many cases, and in accordance with the present invention, an organization may promote one or more of its products or services in the message which is presented in the quiescent period. That party who is attempting to promote its products may or may not be involved in the telephone communication. That party, however, is referred to herein as a "provider", that is, an organization or party who provides goods or services in response to requests by a caller or a recipient, or both. In the event that the term "recipient" is used herein, as opposed to "provider-recipient", it will be deemed to include a provider-recipient, unless the context indicates otherwise.

In most cases, the recipient is typically a friend or family member, or one who is in an acquaintance relationship with the caller. However, the provider is the party who is responsible for offering of a promotional effort in that message. In this case, if the caller attempts to initiate a telephone communication to a recipient who is the same party providing that product or service, that recipient will be identified herein as a "provider-recipient". Thus, the party receiving the telephone call will be identified as a recipient if they are not promoting any product or service, as such, and will be identified as a provider-recipient if the party is also offering a good or service. As a simple example, a call to a friend who is not selling any product or service will be a recipient. A call to a department store which is attempting to promote its products or services, will be identified as a provider-recipient. In many cases, and as indicated, the call may occur between the caller and the recipient, and the provider's message is generated for hearing by the caller or the recipient, or both.

In accordance with the present invention, the software based algorithm, as described herein, will potentially enable reduction of, or replacement of, hardware which would normally be used with a hardware based system for providing such messages in place of, or in addition to, a normal telephone ringing signal. Thus, advertising or promotional messages, or for that matter, informational messages, can fill the mute space between the completion of the dialing process and the answering or unhooking of the telephone by a recipient of the telephone call. The software based algorithm also provides for possible delay of the initiation of the ringing signal, or even complete elimination of that ringing signal, such that the promotional and advertising message(s) can be substituted therefor.

It is recognized that the public in general is accustomed to hearing a telephone ringing signal, both by the intended recipient and a ring-back signal through the telephone link by the person initiating the telephone call. Thus, and in this way, the caller recognizes that the telephone of the intended recipient is ringing to apprise the recipient of a potential phone call. The ring-back signal is an audible signal effect which may be computer generated, and is the result of the non-audible "out-of-band" signal transmitted on the SS 7 line. The term "ring-back" signal is referred to that signal transmitted on the SS 7 line, as aforesaid. Normally, the term "ring-back" signal refers to an electrical signal, which causes a computerized simulation or generation of a ringing effect at the phone of the caller. Nevertheless, and in accordance with the present invention, the term "ring-back" signal will be deemed to refer to that audible effect which is heard by the caller in any telephone communication link.

Since the effect of the ring-back signal is almost inevitably heard by the caller when a ringing signal is generated at the location of the intended recipient, the term "ringing signal", as used herein, will often be deemed to include a "ring-back" signal.

In our aforesaid co-pending utility U.S. patent application, the advantages of the replacement of a message in place of a ringing signal, have been described in some detail. One of the unique advantages which was not set forth, is the use of the software based algorithms of the invention which will allow for a potential reduction in the hardware, which would otherwise be required. Moreover, and in addition, the software based algorithms of the invention allow for elimination of some, or most, of the steps normally undertaken by telephone switching stations. In this way, a subscriber organization can provide, potentially at a lower cost, and perhaps even better service, the generation and playing of prerecorded messages in place of that ringing signal over a telephone communication link. Not only does this type of system provide for potentially lower telephone costs, such lower costs may also be obtained by benefit to a caller from a provider-recipient, through rebates or credits, or the like.

In a normal telephone communication system, a caller initiating a telephone call will cause generation of a signal indicative of a call in process. The signal is transmitted to the central switching station of the telephone recipient (second switching station), and that second switching station of the telephone recipient then generates the ringing signal so that the telephone recipient will recognize the presence of an awaiting telephone call. The second switching station transmits an out-of-band signal, as previously mentioned, on the SS7 line advising the first telephone switching station to generate a ring-back signal to the caller. The first switching station will thereupon generate that ring-back signal.

The software based algorithm and the method of the present invention, may utilize that conventional switching arrangement and ringing signal and ring-back signal generation. However, portions of the switching operation provided by telephone communication companies can be bypassed, if desired, particularly if a subscriber organization having the necessary equipment is used, as hereinafter described. In other words, if that subscriber organization possesses the necessary switching equipment, it is potentially possible to eliminate the use of the telephone company switching operations. As indicated previously, it will be necessary to provide a subscriber station in which recipients, such as companies desiring to advertise goods or services, can arrange for generation of messages to customers and potential customers.

Inasmuch as the software based algorithm of the present invention is largely software based, it may not be necessary to use some of the telephone company switching operations. Any elimination or reduction of use of telephone company switching equipment would possibly reduce some of the costs associated with normal telephone service. Not only does this generate a benefit for the provider-recipient, but that benefit can also translate into lower costs for the caller. The present invention therefore provides a subscriber station algorithm, which provides for the arrangement of advertising or promotional messages to be substituted for all or a portion of a ringing signal in a normal ringing signal sequence.

The present invention also provides an algorithm for a three-way telephone communication, in which a telephone ringing signal to a recipient can be temporarily delayed, so that a communication can take place between a provider and a caller. Under this system, initiation of that delayed call to the recipient can then be completed when the communication between the provider and the caller is completed.

The aforesaid software based algorithm generally recognizes whether a recipient's or provider-recipient's phone is on hook. If the recipient's or provider-recipient's phone is on hook, a message generation can then be initiated. If the phone is off hook, for one reason or another, then the method will terminate. Assuming that the recipient's phone or provider-recipient's phone is on hook, the software based algorithm will operate with a station having prerecorded messages, to be presented to the callers. This station containing the prerecorded messages may be part of the telephone switching circuit, as aforesaid, or it can be independent of the telephone switching system. Nevertheless, the software based algorithm of the invention will cause an identification of the caller, or the recipient, and select a category of messages which can be presented. If the information is sufficiently detailed, the software based algorithm of the invention can even select a particular message for presentation to a caller, or a recipient, or both.

The software based algorithm of the invention is designed to receive an access code, particularly that of the provider-recipient, or the provider, and start the message process. Each provider or provider-recipient is provided with an access code, and that access code identifies the provider or provider-recipient, when a phone call is initiated. In this way, it is possible to track information regarding purchases or returns of merchandise, with regard to that provider or provider-recipient, for use at a later date. In like manner, it also enables a subscriber station to identify the number and amount and time of messages offered by a provider or a provider-recipient. As indicated, a prerecorded message is then capable of being generated. That message is then generated over the telephone communication link between the caller and the receiver.

The software based algorithm for the subscriber station also provides for receiving messages from one or more remote sources. This is quite important in that the messages can be automatically updated at will from the subscriber station by generating new messages, or modifying existing messages, as may be required. A necessary security system is also associated with the ability of the subscriber station to modify or replace existing messages, for presentation to a user.

The automatic generation of new messages, and replacement of existing messages or modification thereof, is quite important, in that it allows for the subscriber station to monitor activity and determine if modification of those messages, or replacement of those messages, would be necessary or desirable. In this respect, the subscriber station can actually monitor activity which could be generated as a result of these telephone communications. Thus, for example, by monitoring potential sales of a provider or provider-recipient's products or services, the subscriber station can potentially make suggestions to the provider or provider-recipient regarding modification of its advertising or promotional material messages to be presented to callers.

A security check would normally be associated with any receipt of data from a remote source. This data could contain confidential information about recipients or callers, or both, and therefore, attempts to unauthorizedly access data could be eliminated, and any attempts to interfere with that data could also be thwarted.

In addition to the foregoing, it is possible for the subscriber station to arrange for billing of the provider or provider-recipient, based on generation of advertising or promotional messages. Thus, for example, the software based algorithm of the invention will maintain a count of the number of messages which have been generated for that recipient, or the time for generation of those messages, or both. For that matter, billing to the provider or provider-recipient can be based on a percentage of increase of revenue received as a result of the software based algorithm of the invention.

In addition to the foregoing, the caller, such as a potential customer, could be provided with the capability of ordering information over the telephone communication link. This may be accomplished by a live operator with whom the caller can communicate, provide the necessary information, and arrange for delivery of the products or services to that caller. In like manner, a provider-recipient, or a provider, as hereinafter described, can effectively also arrange for delivery of one or more items to the caller, or a recipient. Moreover, the caller could also arrange, for example, to return products or services obtained from a provider or provider-recipient.

In place of a live operator, it would be preferable to employ an automatic system, such as a telephone keypad system, used for ordering, or the like. Thus, for example, the caller can receive information from the provider-recipient or provider about, e.g., five different products, and select the one or more products of most interest to that caller. The caller can then automatically introduce a credit card number, or other billing information, so that the caller can be billed for the received products or services, which would be sent by the provider-recipient or the provider, or one on behalf of the provider-recipient or the provider. In this way, the subscriber station can eliminate many of the duties associated with both the delivery, and the billing for goods or services offered by a provider or provider-recipient organization.

The use of the subscriber station, alone, can offer a significant added advantage to a provider or provider-recipient organization to use the advertising or promotional messages on a telephone link. Thus, in addition to the lower cost absorbed by the subscriber station performing some of the functions, the provider or provider-recipient organization also gains through potentially increased sale of goods or services. Further, by monitoring the activity of sales of the provider or provider-recipient, the subscriber organization can also provide other business information to the recipients, to assist them in increasing sales of products or services.

As indicated previously, the provider may provide goods or services, and is usually a sponsor of the message which is generated to the caller, or the recipient, or both. Thus, and as a simple example, the provider or provider-recipient may be an offeror of e.g., sporting goods, who generates a message to be heard by the caller during the quiescent period. This message may also be heard, instead, by the recipient of the call, or both the recipient and the caller. Thus, in this particular example, two parties will be provided with a message about the goods or services offered by the provider, and in this case, sporting goods, which thereby increases the advertising and promotional availability of the products of this provider.

During a telephone call by a caller, that caller may hear a message about a certain product or service offered by the provider. By actuating certain push-button switches on the touch tone generation pad of the telephone, or by other means, the caller may seek to hear further information from the provider directly. In this case, the provider organization can actually be automatically connected into the telephone communication, and provide such information. Also in this case, the ringing signal to the recipient may be temporarily delayed. Thus, if the caller desires to obtain further information, or otherwise to even make a purchase of a certain product or service, the call initiated to the recipient is delayed, typically at the switching station associated with the caller, and that call is not completed. Therefore, the recipient's phone will not ring until such time as the call between the caller and the provider is completed.

In addition to the foregoing, the software based algorithm is also capable of obtaining information about one or more customers and storing that information, in order to alert the caller to further goods or services which may be offered at a later date. Thus, for example, if one caller was consistently interested in sporting goods, that information could be recognized and, on subsequent occasions, when a caller was selecting information, the message could be selected for that caller to provide information on new products or services which may be available.

As an alternative example, if one caller frequently purchased goods or services from a first provider or provider-recipient, that information could be of great value to a second provider or provider-recipient. Thus, when the caller attempted to contact a first organization, the second organization could arrange to have an advertising or promotional message present information about the second potential provider or provider-recipient. This is highly effective as a type of point of sale identification, in that the caller or potential purchaser may then examine the goods or services of the second provider or provider-recipient.

It is also possible, in accordance with the present invention, to use a video telephone system. In this way, the telephone communication link can be operated in conjunction with a video communication link. Thus, for example, demonstrations of a particular product or service can be made. In the case of a computer operated system maintained by the caller or potential purchaser, that caller could not only obtain information about a particular product or service, but that caller can also potentially view the products or services which might be available to that caller.

The present invention also provides a basic algorithm, and a more advanced algorithm, for allowing for the generation of advertising and promotional messages. Thus, in accordance with the software based algorithm of the invention, the message to be presented to the caller, or the recipient, or both, is selected. Perhaps, depending on the amount of information available on the recipient, or the caller, or both, a category of messages can be selected with a particular message being selected from that category. Thereafter, the phone line is monitored in order to determine if a telephone link could otherwise be completed. If that ringing signal would otherwise start operating, the software based algorithm of the invention will interrupt that ringing signal, and delay or otherwise prevent generation of the ringing signal, for replacement of the message instead. In addition, and as indicated previously, it is possible to overlay this message on a normal ringing signal. In either case, the algorithm of the invention is capable of accomplishing either of these functions.

The software of the invention will also monitor the telephone communication link, in order to determine if the ringing signal ends, or whether the recipient's phone is then off hook. In this case, the algorithm of the invention will provide for automatic cessation of the message, so that the caller and the recipient may both communicate. It is also possible, in accordance with the invention, to literally delay the ringing signal in order to increase the amount of time to present one or more messages. However, although possible, that delay is deemed to be undesirable because of the amount of time it would require for a caller or a recipient to remain in a telephone communication link.

The use of the software based algorithm of the present invention is related closely with the life cycle of a telephone. The pressures resulting from Internet communication and video conferencing will, to some extent, determine the life of the system of the present invention. However, it is believed that future innovations in the area of telemarketing and, for that matter, even in the field of Internet communication and video conferencing, will only enhance the software based system of the present invention.

This invention possesses many other advantages and has other purposes which may be more clearly apparent from a consideration of the forms in which it is embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
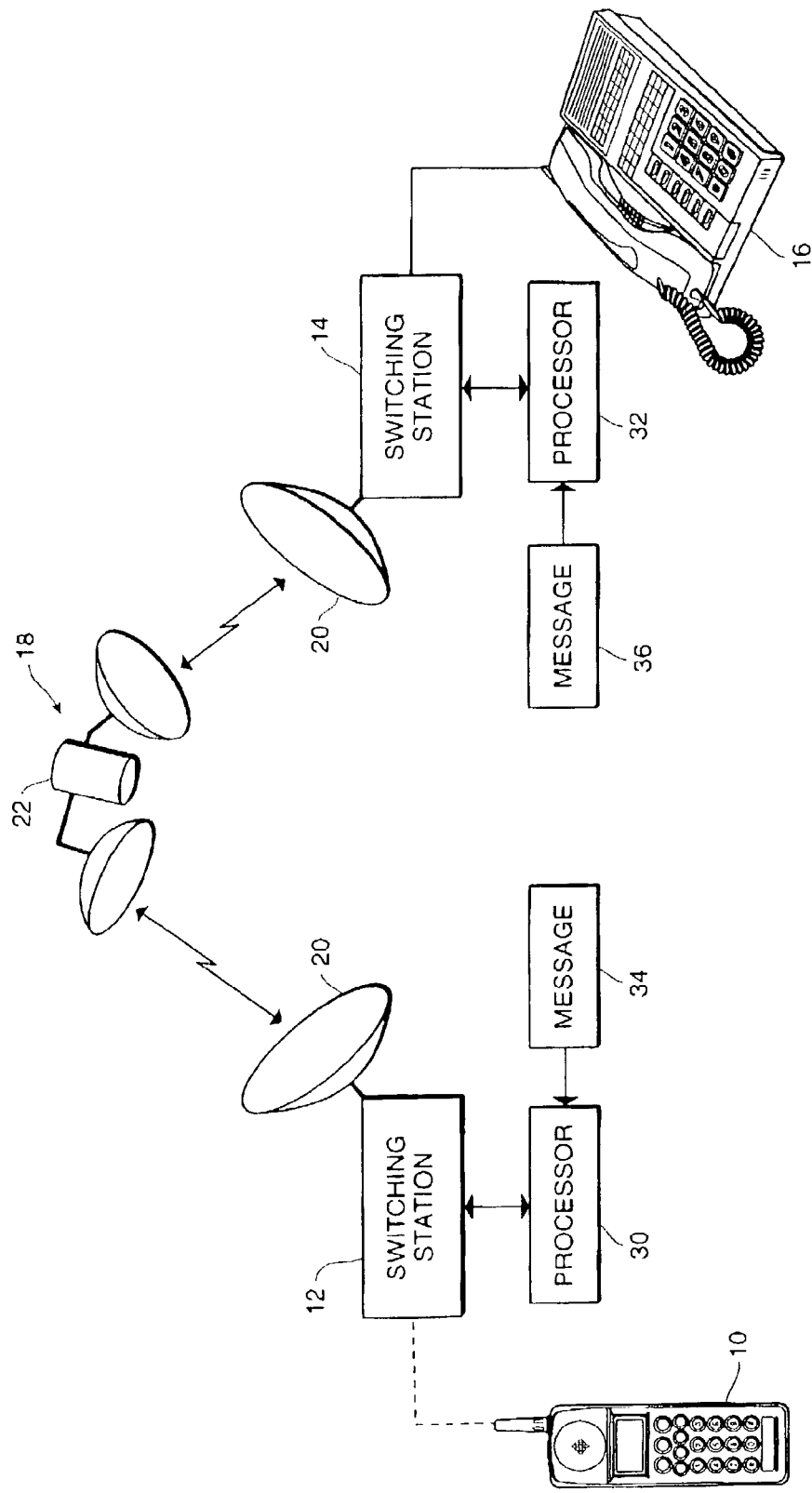
Figure 2:
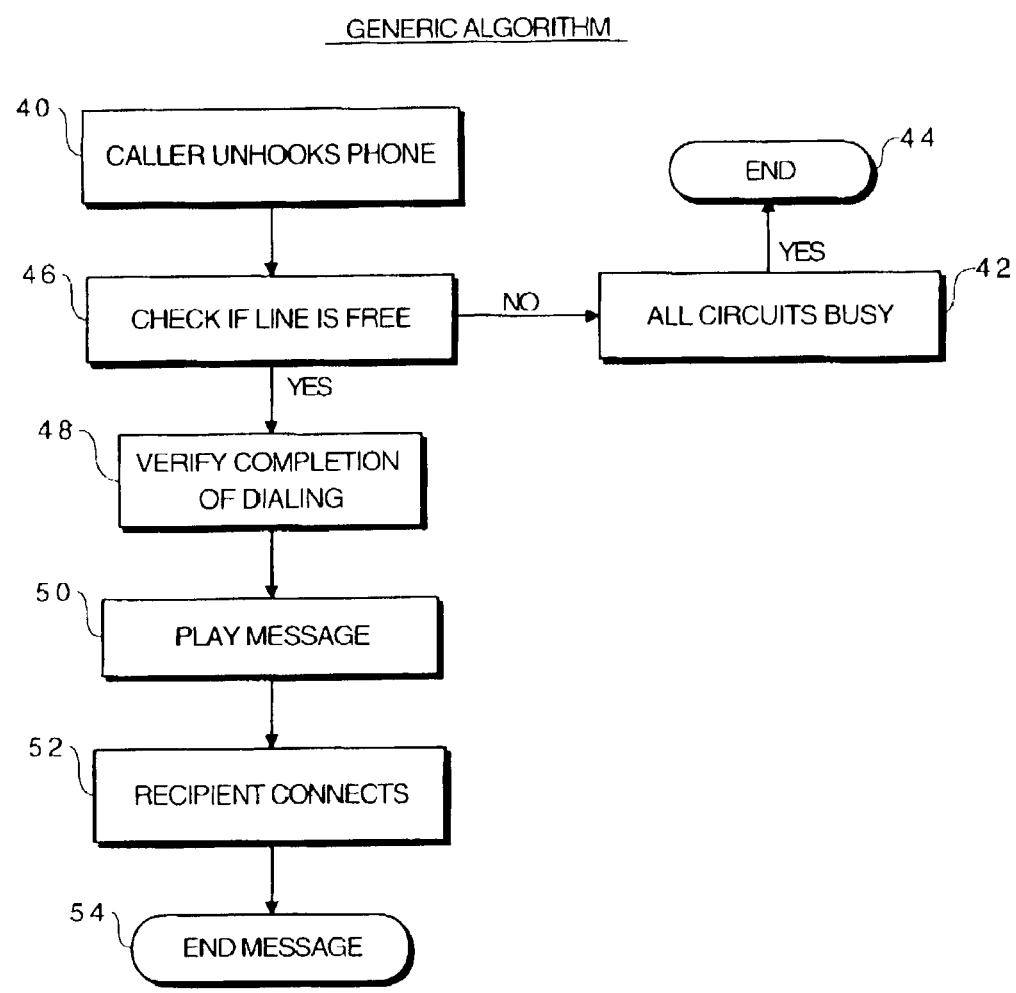
Figure 3:
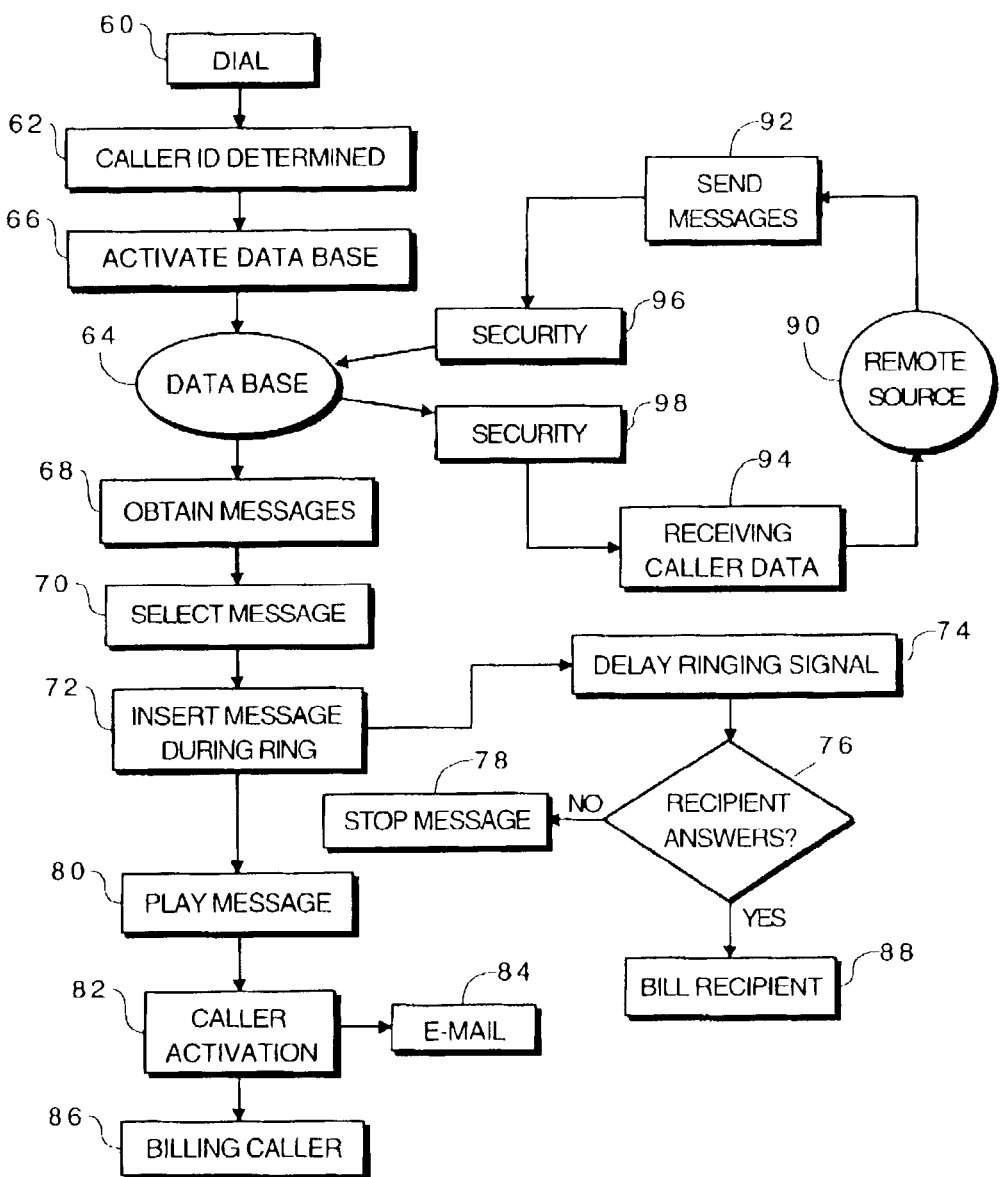
Figure 4:
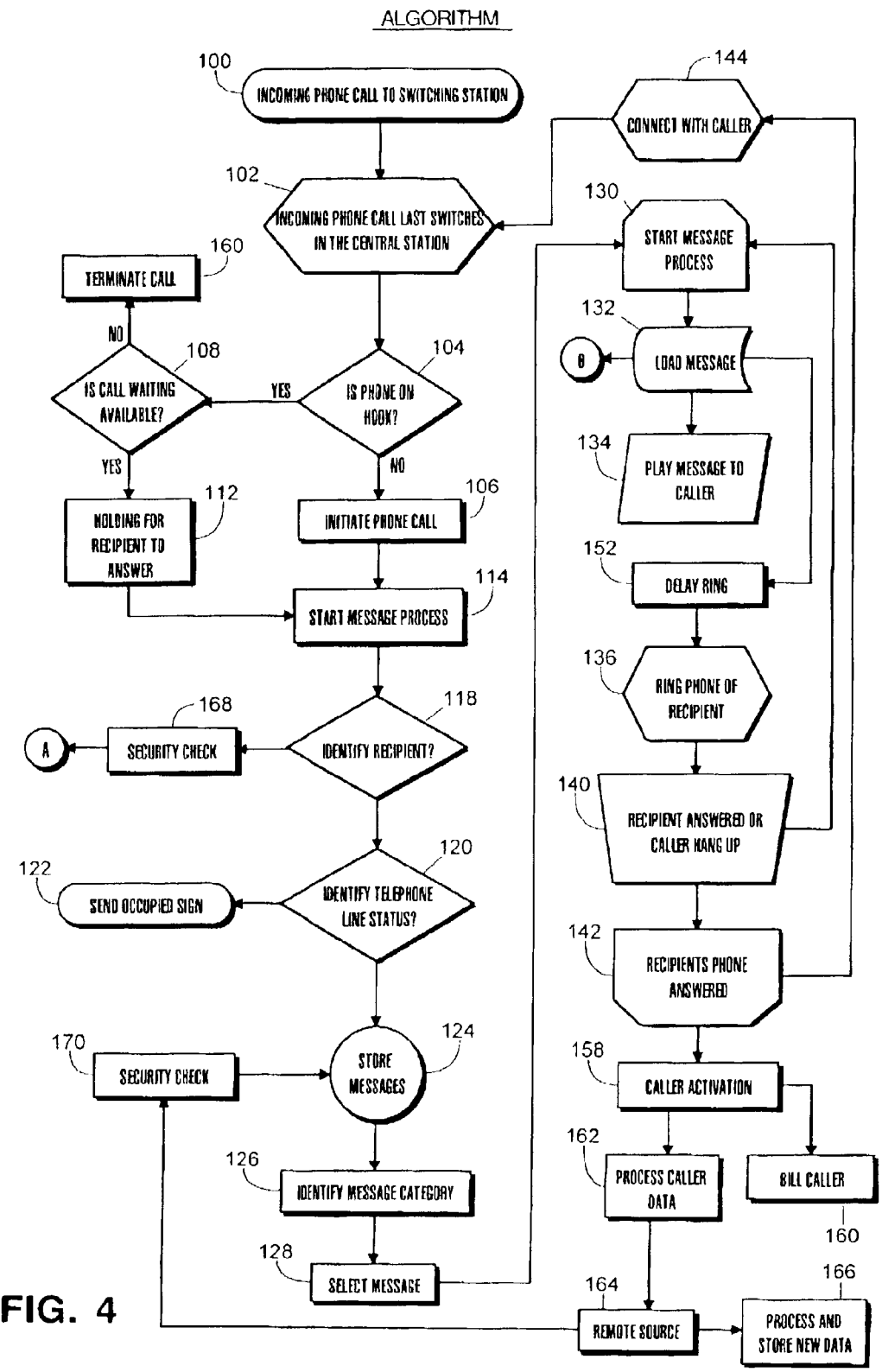
Figure 4A:
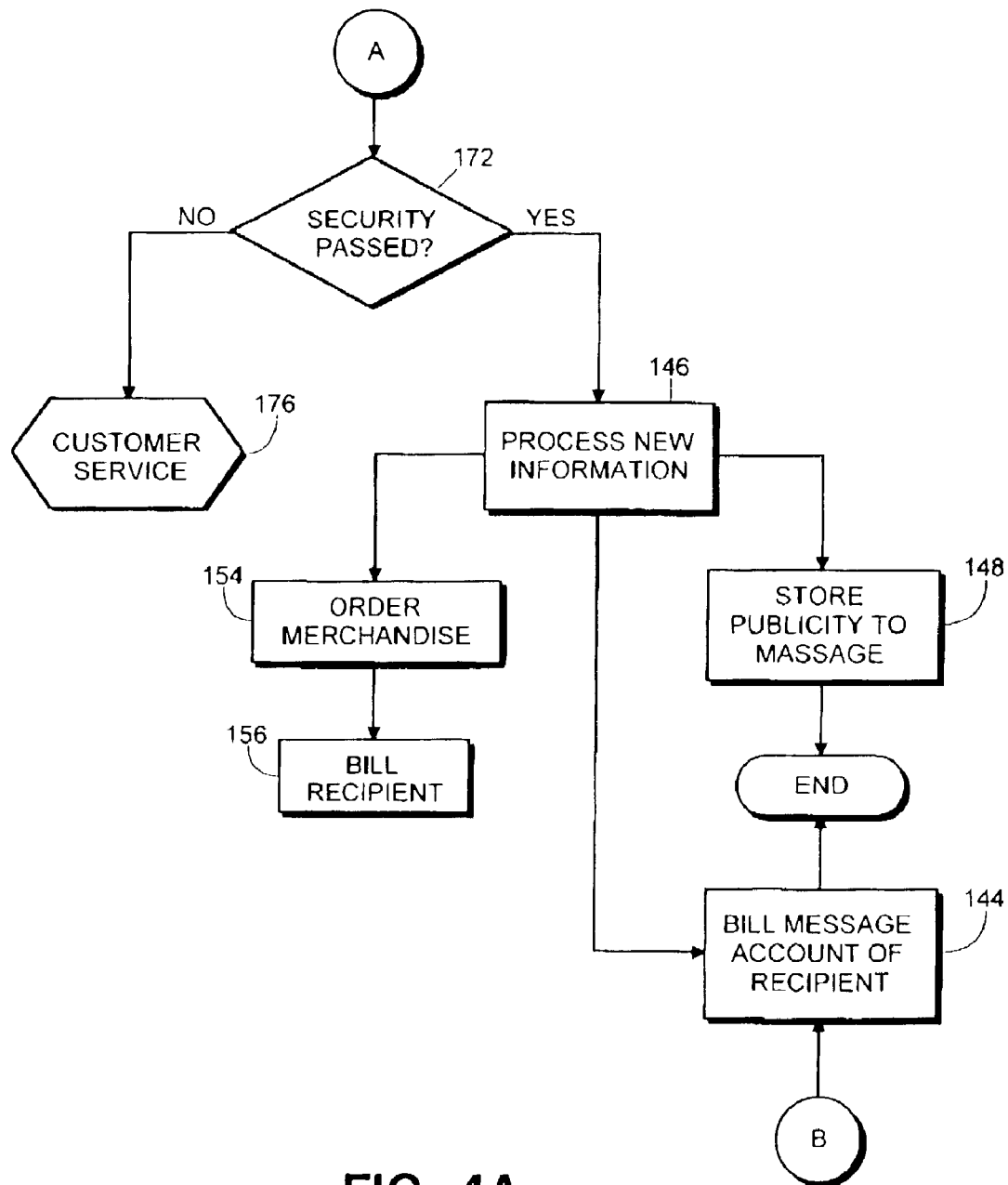
Figure 5:
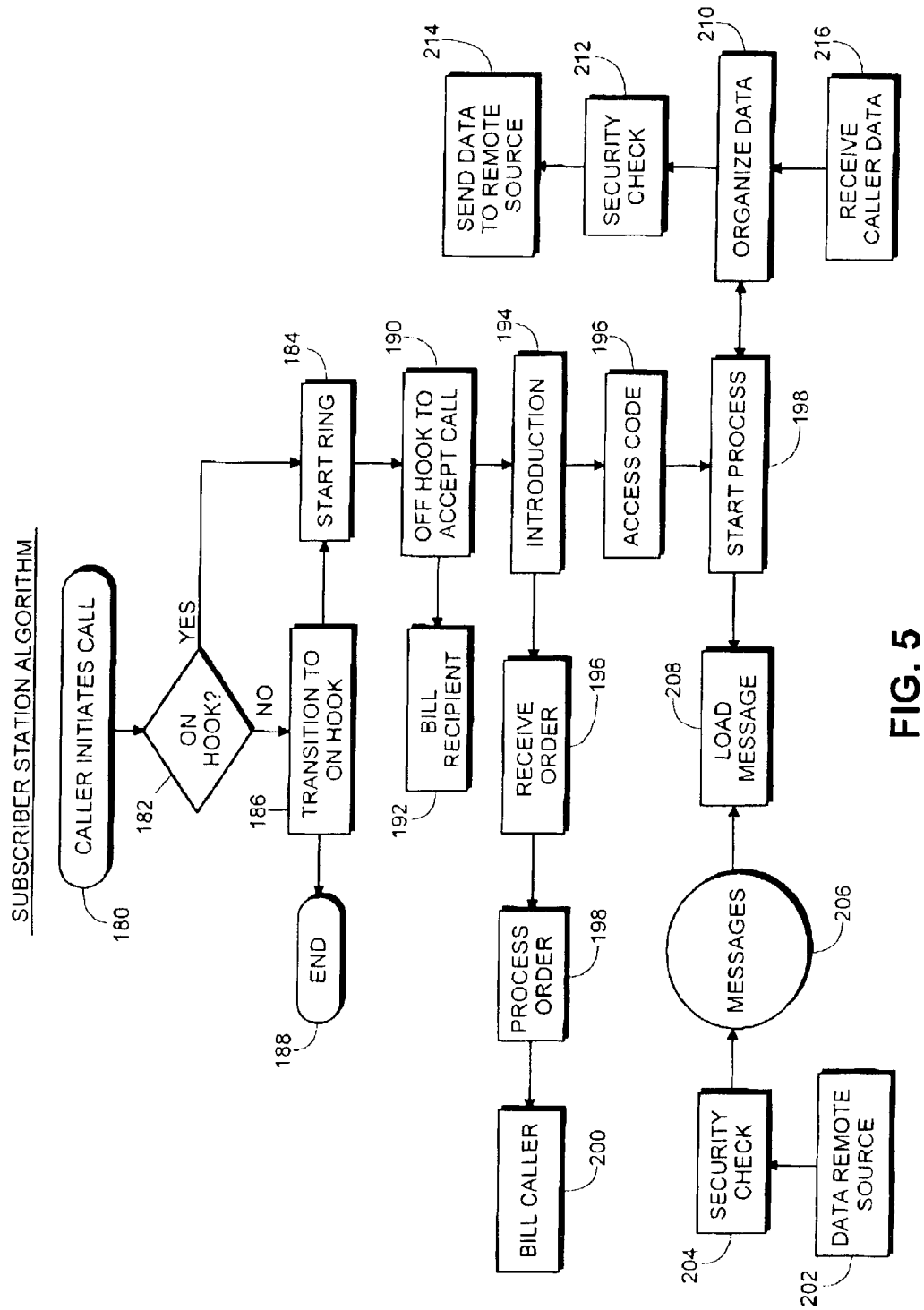
Figure 6:
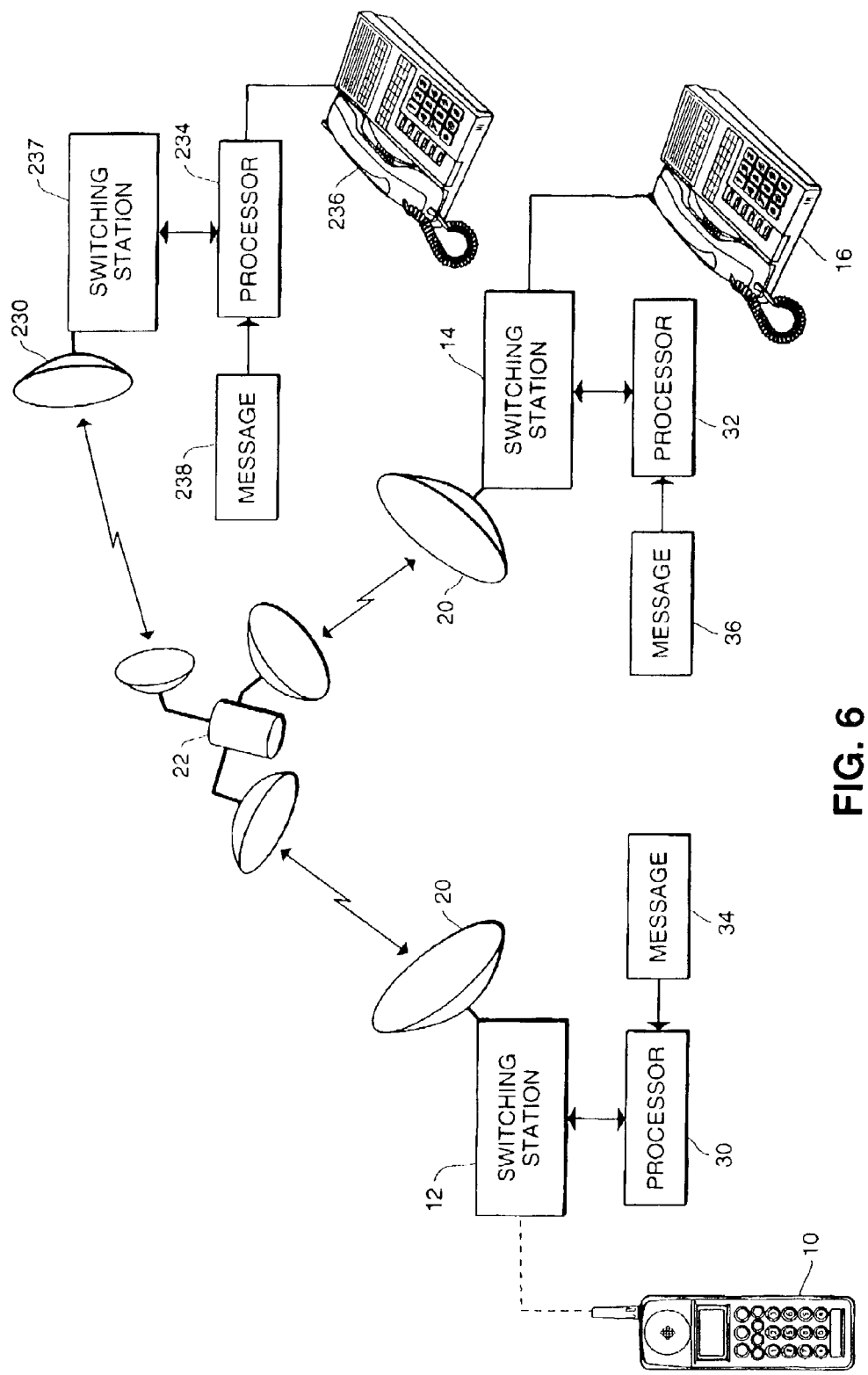
Figure 7:
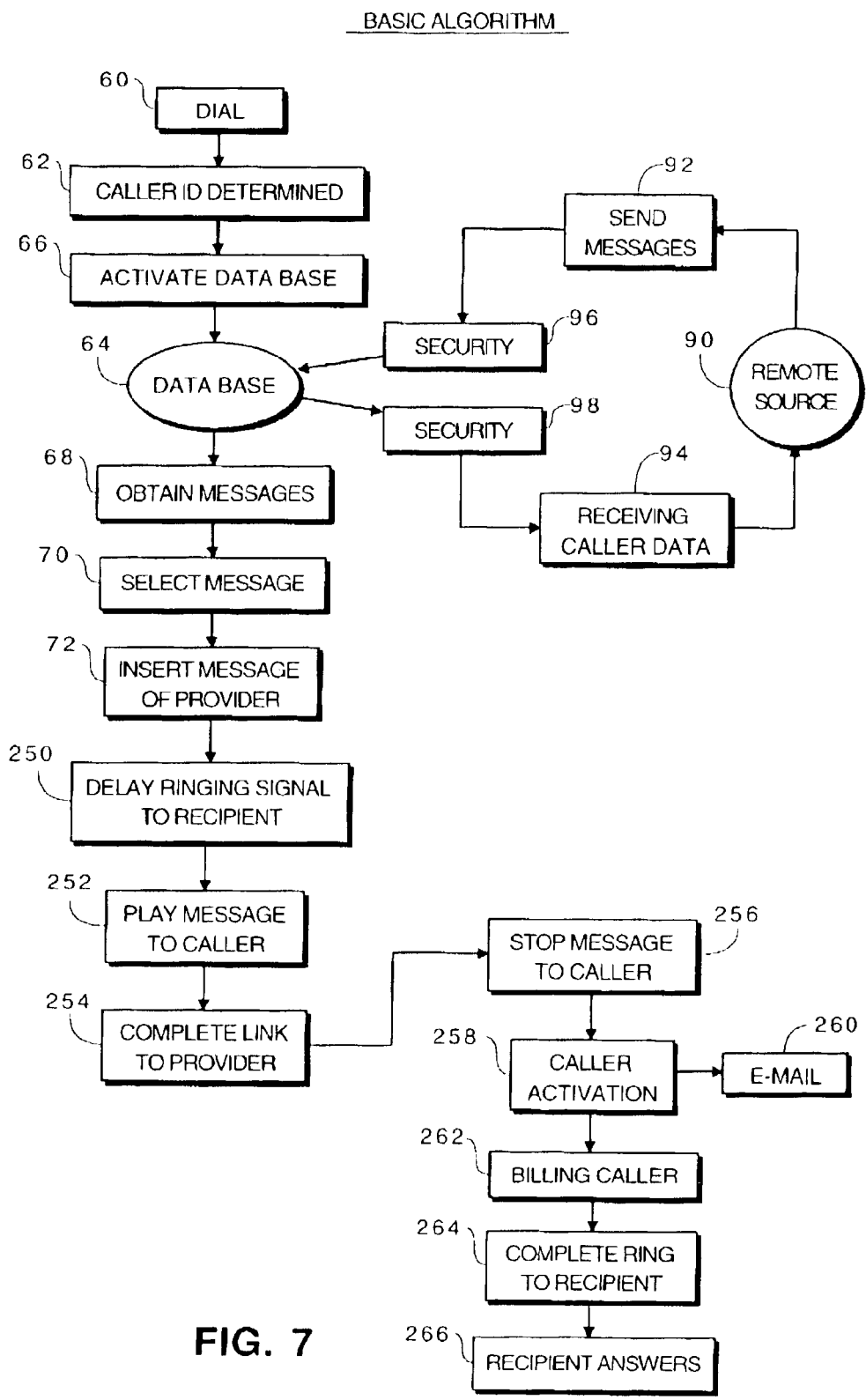

Having thus described the invention in general terms, reference will now be made to the accompanying drawings in which:

FIG. 1 is a simplified schematic view of a telephone communication system, with which the software based algorithm of the invention may be used;

FIG. 2 is a schematic block diagram showing one generic algorithm of the present invention, and essentially outlining the various basic steps forming part of most algorithms, based on the present invention;

FIG. 3 is a schematic block diagram view of a more detailed, but nevertheless basic algorithm, in accordance with the present invention;

FIG. 4, including FIGS. 4a and 4b, is a schematic block diagram, showing one of the preferred software based algorithms for generating messages, in accordance with the invention;

FIG. 5 is a schematic block diagram, showing a subscriber station algorithm, in accordance with the invention;

FIG. 6 is a simplified schematic view of a telephone communication system, in which communication also involves a third party provider, and which uses a third party provider algorithm of the invention; and FIG. 7 is a schematic block diagram, somewhat similar to FIG. 3, but showing the steps involved in the algorithm when a third party provider is involved in the telephone communication link.

DETAILED DESCRIPTION OF PREFERRED EMBODIMENTS

Referring now in more detail and by reference characters to the drawings, which illustrate software based algorithms used in the present invention, each of these algorithms are designed to operate with a hardware system which allows for introduction of a message, such as an advertising or promotional message, over a telephone communication link. For this purpose, one conventional telephone communication link is shown in FIG. 1.

The conventional telephone communication link includes a telephone of a caller, which in this case is illustrated as a cellular telephone 10. The cellular telephone could be a hard wire telephone, but merely illustrates a caller location.

The cellular telephone 10, or caller's telephone, is associated with a first telephone switching station 12. This telephone switching station 12 operates in conjunction with a second telephone switching station 14, and which in turn services a recipient's telephone 16. Telephone information, including switching information, telephone transmission voice information, and the like, can be transmitted between the switching stations 12 and 14, by a satellite antenna system 18, including antennas 20 and a satellite 22. In place of the satellite system 18, it is possible to use hard wired communication or other wireless communication, between the pair of switching stations 12 and 14.

One of the important aspects of the invention is that it is generally designed for operation with symmetrical telephone switching stations. Thus, in this way, the first switching station which can function as a transmitting switching station for transmitting telephone signals, can similarly operate as a receiving station for receiving transmitted signals. Thus, transmission from the telephone 10 will occur through the first switching station 12 and the second switching station 14, to the telephone 16. In like manner, initiation of a call from the telephone 16 will operate just in reverse.

Although not specifically illustrated in FIG. 1, each of the switching stations now normally operate with an electronic processor, which may be in the form of a main computer. As indicated previously, conventional switching equipment has now been automated to be electronically operated. Thus, each of the switching stations would have their own individual computer or processor for operation thereof.

In accordance with conventional practice, if a telephone call is initiated from the location of the telephone 10, and directed to the first central switching station 12 and then transmitted to the second central switching station 14, it is that second central switching station which initiates and sends the ringing signal to the location which receives that telephone call, namely, the telephone 16 at a second location. In like manner, the first central switching station 12 also generates and transmits a ring-back signal to the first or calling telephone 10. Again, in order to achieve the symmetry of the switching system, if the second telephone 16 initiated the telephone call to be received at the first telephone 10, the first central switching station 12 would initiate the ringing signal to be heard at the first telephone 10, and potentially a ring-back signal to be heard at the second telephone 16.

In accordance with later conventional practice, the first switching station 12 will be operable with a first processor or computer 30 and the second switching station 14 will be operable with its own processor or computer 32. In order to generate the messages which are to be delivered, in accordance with the algorithm of the invention, each processor may internally include a storage containing the prerecorded messages to be generated. In like manner, a separate message device 34 may be associated with the processor 30, and a message device 36 may be associated with the processor 32, for delivering messages to the respective processors, in accordance with the demands of the processors.

It should also be understood that appropriate programming of a main computer at the central office 12 or at the central office 14 could be used to potentially reduce the need for the processor 30 and the message generator 34, as well as the processor 32, and the message generator 36. However, in order to simplify alteration of the conventional telephone system, the use of these separate processors and message generators may be preferred. It is also to be recognized that a message generated by the message generator 34 could be delivered to the second telephone location 16 or to the first telephone location 10, or to both. The same holds true with a message generated at the second message generator 36.

It should be recognized that the quiescent period is that period of time which exists between the actual completion of the dialing process and the time when the recipient at a second location answers the telephone at that second location. That time may vary depending upon the delay occasioned by the recipient at the second location. Nevertheless, the time period is still fixed in that it commences at the completion of the dialing process and ends at the time that the recipient at the second location answers the telephone at that second location. The same holds true whether or not the telephone at the second location is answered by a telephone answering machine.

It is also possible to generate different messages with one intended for the recipient of the phone call and the other intended for the caller. In most cases, and where the system is being used to present advertising and promotional messages, the message will be generated primarily for the caller to hear in place of or in addition to a ringing signal.

The processor at each of the switching stations can also be operated so as to cause a message to be overlaid upon a ringing signal. That is, the ringing signal can be heard with reduced volume, as for example, a background ringing signal with the message also presented therewith. In addition, it is possible to eliminate a portion of the ringing signal and to present the message in the eliminated portion of the ringing signal. Finally, it is also possible to completely eliminate the entire ringing signal and generate a message during that period. This latter case is electronically the easiest to implement and the one which will be most frequently employed.

Referring now to FIG. 2, there is shown a generic algorithm, which can be used for generating software of the type which will enable operation of a message to be generated over a telephone ringing signal period. As a first step, a caller unhooks a phone, that is, the caller turns on a cellular phone, or otherwise removes a handset from the cradle, or the like, at step 40. The system will then be operated to automatically check to see if the line for that caller to a recipient is free. If the line is not free, and all circuits remain busy, then the algorithm will end at step 44. However, if the line is free at step 46, the algorithm will enable the system to verify a completion of the dialing, that is, the introduction of a dialing signal at step 48. After the completion of the dialing operation, but potentially before generation of a ringing signal has been verified, a message will be played at step 50. When the receiver connects, which is represented by step 52, that is, detection of the unhooking of the telephone by the recipient, the message will end at step 54.

In effect, the algorithm just described in FIG. 2 is a generic to all telephone operations of this type in which a message is generated over a ringing signal, or so-called "quiescent period". In other words, all algorithms will cause an investigation of a caller's line to determine if the line is available and if so, will verify a completion of a dialing operation. Upon verification of that dialing operation completion, a message will be played until the recipient actuates the recipient's handset, and at that point, the message ends.

FIG. 3 illustrates one basic algorithm which can also be used in the present invention. In this case, a caller dials a telephone in order to contact a certain recipient, at step 60. An identification of the caller is determined at step 62, and when that identification is determined to be a proper identification, a database 64 is actuated at step 66. In other words, the data, that is, messages on that database, are located and can be introduced into a system which will allow play of the messages. Thus, the messages are obtained from the database 64 at step 68.

After a group of the messages have been located, one or more particular messages are selected at step 70, based on factors such as the type of caller, perhaps the demographics of the type of caller, or other information which may be available. After the message has been selected, it is then inserted into a storage or other mechanism, for play over a telephone communication at step 72. As indicated previously, it is possible to delay the ringing signal in order to increase the available amount of time for the message. Although undesirable, if a delay is elected, that delay can be introduced at step 74. When the recipient answers the telephone at step 76, it will cause a stopping of the message at step 78. However, if the recipient does not answer the telephone, then the message will continue to play at step 80.

After the message is being played at step 80, a caller can activate a potential purchase mode. Typically, the caller can make one or more selections by using push-button switches on a pushbutton tone generator. Thus, caller actuation occurs at step 82, and this allows activities to take place as selected by the caller. Thus, if a caller elects to purchase a particular product or service, the caller can arrange therefor at step 82. The caller can also use email at step 84 to verify a purchase, or to work out details of shipment of a purchase. Finally, the caller is then billed at step 86.

An important aspect in the system of the present invention is that when a recipient answers a telephone, or for that matter, when a message is played, even if a recipient does not answer the telephone, the provider or provider-recipient may be billed at step 88. As indicated previously, the provider or provider-recipient will pay for the amount of telephone time, or the number of calls, or both. Consequently, billing can be conducted automatically, much in the same manner as long distance phone calls are billed to a particular customer.

Another important aspect of the present invention is the fact that information can be obtained from, or introduced into, a remote source 90. This remote source 90 could be operated to send messages at step 92, or otherwise, to receive caller data at step 94, all as best shown in FIG. 3. A security mode would be operable at step 96 when messages are sent to a message generating system, and a similar security mode 98, would be operable when caller data was introduced into the remote source. It may be appreciated that data regarding one or more callers could contain information about that one or more callers, or could otherwise be personal to those one or more callers. Therefore, it is important to insure that there is no unauthorized access to the data, and that there is no tampering with data which may be stored at the remote source, and that there is no tampering with data which may be introduced into a message generating system. Consequently, these security steps are quite important.

The use of storing data at a remote source is highly effective, in that when a particular caller, or for that matter, group of callers are identified, information about the purchasing habits of that caller or those callers can be obtained. Thus, in the case of a particular caller or individual caller, when that caller is identified, typically by telephone number, information as to the purchasing habits of that caller can be determined. Moreover, information can be obtained on the amount of money that a caller is willing to spend for a selected item. Again, as a simple example, information can be obtained as to whether or not the caller is interested in a high priced item or a low priced item. If information is obtained about a group of callers, this may typically occur demographically. Thus, callers from a certain group or area can be determined by virtue of area codes, or the like, forming part of the telephone number. Again, purchasing habits or information about the likes and dislikes of that group of callers can also be determined.

It is important to recognize in connection with the present invention, that this information is not only beneficial to a party who is desirous of offering products or services, but it is also beneficial to a potential purchaser. Thus, information about a particular product or service can be made available to a potential purchaser, almost at the point of purchase. In this way, the potential purchaser or caller is provided with more updated information at the point of purchase. In like manner, and from the perspective of the party offering such goods or products or services, a point of sale advertisement is readily made via a telephone communication.

FIG. 4 illustrates a more detailed form of software based algorithm, in accordance with the invention, and which is operable with both land based telephone systems, that is, hard wired telephone systems, and cellular telephone systems. In this case, an incoming phone call is recognized at a switching station in step 100. The algorithm then determines if the incoming phone call was last switched in the central station of the telephone of the recipient. If the phone call was last switched at the switching station therefor, as determined at step 102, then the algorithm of the invention will allow for determination as to whether or not the phone was on hook at step 104. If the phone was not on hook at step 104, that is, the recipient's telephone, then the algorithm will allow a phone call to be initiated at step 106. Even if the phone was off hook at step 104, then a call waiting availability determination is made at step 108. If there is no call waiting available, then the call will terminate at step 110. On the other hand, if call waiting is available, then the system can allow for holding for the recipient to answer at step 112. At that point, the message process is started at step 114. Thus, it can be observed that either at step 106 or at step 112, the message can be started for presentation to either the caller or the recipient, or both.

At this point, the algorithm will then provide for identification of the recipient at step 118. Moreover, the algorithm also allows for a telephone system to determine the status of the telephone line at step 120. If the line is occupied, then an occupied signal will be sent at step 122. If the line is not occupied, a search for a message will take place at step 124. In fact, it is possible to identify a category of messages at step 126, and thereafter select a particular message from one or more categories at step 128.

It can be observed that one or more messages can be prerecorded and stored at step 124. In effect, a memory will be provided for the retention of the various messages, and moreover, data can be associated with those messages, such that when a particular caller initiates a telephone call, a message can be selected for that particular caller, or group of callers, as aforesaid.

After a message has been selected at step 128, the advertisement or message process is commenced at step 130. In this case, a particular category of messages is loaded at step 132. A selected message in that category is then actually played to a caller at step 134. Furthermore, after the loading of the message, the phone ringing signal for the recipient is initiated at step 136.

The recipient can then answer the telephone, or the caller can hang up. In each case, the ringing signal is stopped and any message which may be generated is also stopped at step 140. It can be observed that when the recipient answers the telephone, or otherwise the caller hangs up, a signal represented by a step 142, is introduced into the message process for terminating that message. In like manner, when the recipient's phone is answered at step 142, the message is stopped. It can be observed that when the recipient is connected in a telephone link with a caller at step 144, there is, again, a playback to step 102, in which the process can be reinitiated at a later time.

One of the important aspects of the present invention is that when a message is generated, the account of the provider or the provider-recipient can be automatically billed at step 144. In addition, it is possible to also process new information at step 146. That new information, which may be publicity information, may be stored at step 148, and at which point the message process ends at step 150.

As indicated previously, it is also possible to delay the ringing signal. For this purpose, a delay signal can be provided at step 152, to cause a delay in generation of the ringing signal, thereby lengthening the time of a quiescent period. In this way, a longer message or more messages can be generated.

It is also possible, in accordance with the algorithm of FIG. 4, to order merchandise or obtain other information over the telephone communication link. In this case, step 154 is provided for the ordering of merchandise. It should be recognized that other activities could be undertaken in place of the ordering of merchandise, or in addition to the ordering of merchandise. In any event, the caller can communicate with an individual representing the provider or provider-recipient, or otherwise conduct electronic purchases through actuation of push-button switches on the telephone keypad. Moreover, after merchandise has been ordered at step 154, it is possible to bill the purchaser, typically the caller, at step 156. As indicated previously, the provider or provider-recipient is billed for the generation of the messages over the telephone communication link.

It is also possible for the caller to order merchandise at step 158, and the caller is then billed at step 160. As a result of actuation of a telephone, by introducing telephone keypad signals or the like, information is inherently obtained about that caller. That information can be processed at step 162, and then delivered to a remote source at step 164. In effect, by processing the information, it can be organized in accordance with, for example, amount of money spent, type of merchandise obtained, whether the merchandise was high end merchandise or low end merchandise, the area code of the caller, and hence, the approximate location of the caller, and like information. This information can then be used to provide additional information to the caller at a later time, and also enables a recipient to determine what information might be of interest to that particular caller, or group of callers.

The new data which has been obtained regarding the callers at the remote source at step 164, can then be processed and that data stored as new data at step 166. That data can be then introduced into the message storage at step 124, after a security check with respect to that information is made at step 168. That security check may well include a determination as to whether anyone attempting to access that information is an authorized user thereof.

It is also to be noted, in accordance with the present invention, that after a caller or a recipient, or both, is identified, information regarding that telephone call can be stored and is processed at step 146. That information, again, must pass through a security check 170, and passes security at step 172. If it does not pass the security step, then the algorithm will automatically initiate a contact with a customer service station at step 176.

In one important aspect of the invention, it is possible to install an electronic circuit chip directly in cellular telephones, such as the cellular telephone 10. In this way, it is possible to automatically update information into each cellular telephone, via wireless signals from a remote source. In this way, it possible to also bypass the switching station of the telephone company, such as those switching stations 12 and 14.

FIG. 5 illustrates a subscriber station algorithm, which allows for operation of a message in place of, or in addition to, a ringing signal. As indicated previously, a subscriber station may be necessary in order to provide for the generation of the message over a caller's telephone, or recipient's telephone, or both. The subscriber station provides a multitude of functions for and on behalf of the provider or the provider-recipient and the caller. However, and for the benefits provided by the subscriber station, a revenue is generated for the subscriber station from the recipients. Typically, the provider or the provider-recipients gain advantage for advertising and promotional messages, or for that matter, informational messages which are generated to potential purchasers, and the latter of which constitutes the callers. Moreover, the subscriber station can even arrange for ordering of products or services, and the storage or transport of such products or services. In addition, the subscriber station can also arrange for billing of the caller or other purchaser who obtains products or services through the message system of the invention.

As indicated previously, the subscriber station can maintain its own PBX system or switching station, so that it can co-act directly with the provider or provider-recipient and the caller. In this way, telephone charges are substantially reduced. Moreover, the provider and the provider-recipient gains not only through potentially reduced telephone costs, but from the advertising or promotion, as well as those services provided to the provider and the provider-recipient by the subscriber station.

In accordance with FIG. 5, a caller initiates a telephone call at step 180. The algorithm for the subscriber station operation then determines at step 182 if the recipient's telephone was on hook or off hook. If the phone was on hook, then the subscriber station allows for initiation of a ringing signal at step 184. In actuality, this ringing signal will occur only through the algorithm as shown in FIGS. 3 and 4, for example. In any event, if the phone is not on hook, there is a transition to on hook at step 186 and at which point the algorithm will end at step 188. If there is initiation of a ringing signal, at step 190 there is a determination to accept the call if the recipient's phone is off hook. At that point, the message generation will start and the provider or provider-recipient is automatically billed at step 192 by the subscriber station. After it has been determined that the phone is off hook at step 190, there is an introduction step at 194, which will allow for access of the code of the provider or the provider-recipient at step 196. This starts the process at step 198.

It should be recognized that those steps, which allow for complete operation of the message generation during the quiescent period is set forth in FIG. 4, and is not repeated here in FIG. 5. Rather, the step introduction 194 allows for the complete generation of that message in the ringing signal period.

It is important to recognize that the subscriber station can also receive an order at step 196 from a customer, such as a caller, and can process that order at step 198. The subscriber station can also arrange for billing of the caller at step 200.

One of the important aspects of the algorithm performed by the subscriber station, is the fact that data from a remote source at 202 can pass through a security check 204, and to be loaded into a message storage 206. The actual loading of the messages occurs at step 208. Again, it should be recognized that a selection is made of the particular messages which would be loaded and generated for a recipient, or a caller, or both.

Another important aspect and function accomplished by the subscriber station is to obtain data at step 210. That data passes through a security check at step 212, and is then sent to a remote source at 214. The subscriber station will actually collect that data and process the data at step 216, so that the same can be passed through the security check and be sent to the remote source at step 214.

FIG. 6 is a brief schematic diagrammatic view, showing a three way telephone link involving a caller and a recipient of that call, as well as a separate provider therefor. In the previous embodiments, the recipient was an individual who was not promoting any activity, or otherwise, a provider-recipient. In the embodiment as shown in FIG. 6, there is a separate provider who is not necessarily a recipient of any phone communication initiated by the caller. In this latter case, it can be observed that the major portion of the link involving the caller and the recipient is essentially the same. However, connected to the satellite system 18 is a provider network, comprised of a satellite antenna 230, in communication with the satellite 18. That antenna 230 is connected to a provider switching station 232, and which is, in turn, provided with its own processor 234. The processor is thereupon connected to a provider telephone system 236. Moreover, and as indicated previously, it is possible to have a separate message generating device, such as a storage center for messages 238.

It should also be observed that it is not necessary to provide a symmetry in construction with the provider network, as it was with the caller and the recipient. In this case, there is only a provider, and that provider may communicate with the caller or the recipient, or both.

In accordance with the system as set forth in FIG. 6, a provider can interrupt a ringing signal to the telephone 16, and provide a message from the message recorder 238, for hearing by the caller. Otherwise, the message could be generated for both the caller, or the recipient, or only the recipient. Thus, for example, if the caller should hear information from the provider, or otherwise be in communication with the provider, and desires more information, the caller can take certain action, as for example, by actuating one or more push-button switches on his or her telephone. This will alert the provider station, and the provider and the ringing message, which would normally be delivered to the recipient telephone 16, is delayed. The caller can then proceed to either communicate with the provider directly, or purchase one or more products or services. Again, this purchase could be by actuation of push-button switches on the telephone of the caller 10.

When the caller has ceased operation and the communication link with the provider, then the provider automatically disconnects and the ringing signal from the switching station 14 will then be delivered to the recipient's telephone 16.

FIG. 7 more fully illustrates an algorithm which is used when a provider forms part of the telephone link. Those steps, starting with the dialing operation at step 60, through the insertion of the message at step 72, are used herein, as set forth in FIG. 3. Beyond this, there is an automatic delay of the ringing signal at step 250, so that there is no ringing signal heard at the telephone of the recipient 16. At that point, a message is played at step 252. If a telephone link is completed to the provider at step 254, the message to the caller is stopped at step 256. In addition, caller activation can also be obtained, such that the caller can actuate one or more push-button switches, as aforesaid, and select and order products or services at step 258. In like manner, it is possible to use a combination of email communication at step 260.

After the caller has activated the push-button switches, and presuming that a purchase is made, the caller is billed at step 262. At that point, any link between the provider and the caller is terminated, and the ringing signal to the recipient is completed at step 264. When the recipient answers at step 266, there is a normal telephone communication link established, as if there were no message intervention.

Thus, there has been illustrated and described a unique and novel software algorithm and method enabling message presentation during a telephone ringing signal period and which thereby fulfills all of the objects and advantages which have been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what we desire to claim and secure by Letters Patent is:

1. A software based algorithm for operation of a telephone system in which a generated sound presentation can replace or overlay a ring-back signal normally heard in a caller's telephone until such time as a recipient of a telephone call answers the telephone call, said algorithm comprising the steps of:
   a) initiating those actions to identify the class of persons represented by the caller;
   b) introducing a sound presentation to be generated over the telephone which replaces a portion of or all of the ring-back signal;
   c) determining whether the telephone line of the recipient telephone is busy;
   d) terminating the telephone call and generating no sound presentation if the telephone line is busy and allowing for a sound presentation if the telephone line is not busy;
   e) initiating those actions to play the introduced message to the caller or the recipient or both; and
   f) terminating the playing of the sound presentation upon answering of the phone call by the recipient.

2. The software based algorithm of claim 1 further characterized in that the algorithm causes initiating those actions to identify the status of the telephone line between the caller and the recipient and terminating the telephone call if recipient telephone line is busy.

3. The software based algorithm of claim 2 further characterized in that the algorithm comprises initiating those actions to select and identify a sound presentation category which contains the message to be generated, before playing of the introduced message.

4. The software based algorithm of claim 1 further characterized in that the algorithm comprises initiating those actions to generate a billing of the caller or the provider or the provider-recipient or bath based on the telephone call initiated by a caller.

5. The software based algorithm of claim 1 further characterized in that the algorithm initiates those actions to generate and play the sound presentation during a portion of or the entire time that a ringing signal would normally be heard by the caller or the recipient or both.

6. The software based algorithm of claim 5 further characterized in that said algorithm initiates those actions to reduce the sound level of a ringing signal and the generation of a sound presentation overlying that ringing signal.

7. The software based algorithm of claim 5 further characterized in that said algorithm initiates those actions to eliminate the ringing signal and generation of a sound presentation in place of the ringing signal.

8. The software based algorithm of claim 5 further characterized in that said sound presentation is an advertising or promotional message and which is generated during a portion of the entire period in which a ringing signal would normally be heard at the telephone of the recipient.

9. A method of generating a sound presentation over a telecommunication link during a portion of or all of a normal ringing cycle period between the completion of a dialing process by a caller and the time when a telephone of the recipient is answered, said method comprising:
   a) initiating a telephone communication by terminating of the sound presentation when the intended recipient answers the telephone;
   b) selecting one or more sound presentations based on the identification of the class of persons represented by the caller before generating of that sound presentation; and
   c) generating the selected one or more sound presentations to be provided during a portion of or the entire time that a ringing signal would normally be generated at the telephone of the recipient and which generated sound presentation can be heard by the caller or the recipient or both;
   d) determining whether the telephone line of the recipient telephone is busy; and
   e) terminating the telephone call and generating no sound presentation if the telephone line is busy and allowing for a sound presentation if the telephone line is not busy.

10. The method of generating a sound presentation over a telecommunication link of claim 9 further characterized in that the method comprises identifying the class of persons represented by the caller before selecting the one or more sound presentations to be presented.

11. The method of generating a sound presentation over a telecommunication link of claim 10 further characterized in that the method causes the sound presentation to be generated at a telephone switching station for the caller or the recipient or both.

12. The method of generating a sound presentation over a telecommunication link of claim 10 further characterized in that the method causes the sound presentation to be received at the telephone of the caller or the recipient.

13. The method of generating a sound presentation over a telecommunication link of claim 10 further characterized in that said method comprises introducing and storing information relating to the be generated from a remote source.

14. The method of generating a sound presentation over a telecommunication link of claim 10 further characterized in that the method further comprises:
   (1) identifying the class of persons represented by the caller;
   (2) thereafter identifying the category of sound presentations in which the sound presentation to be generated is contained; and
   (3) selecting one or more messages in an identified category to be generated.

15. The method of generating a sound presentation over a telecommunication link of claim 14 further characterized in that the method comprises identifying the status of the telephone line between the caller and the recipient before generation of the sound presentation.

16. The method of generating a sound presentation over a telecommunication link of claim 10 further characterized in that the method comprises generating a billing to the caller or the recipient or both based on the telephone call between the caller and the recipient.

17. The method of generating a sound presentation over a telecommunication link of claim 16 further characterized in that the sound presentation is an advertising or promotional message which is generated during a portion of the entire period in which a ringing signal would normally be heard at the telephone of the recipient.

18. A method of presenting an advertising or promotional sound presentation specific to the potential interests of a customer or a group of customers over a telecommunication link during a portion or all of a normal ringing cycle period in that telecommunication link, between the completion of a dialing process by a caller and the time when a telephone of the recipient is answered, said method comprising:
   a) initiating a telephone communication link to an intended recipient;
   b) identifying a class of persons represented by a caller to that recipient;
   c) determining whether the telephone line of the recipient telephone is busy;
   d) terminating the telephone call and generating no sound presentation if the telephone line is busy and allowing for a sound presentation if the telephone line is not busy;
   e) comparing that identification against a stored source of information and determining a potential buying pattern of the caller from that information;
   f) generating a message to be provided during a portion of or the entire time that a ringing signal would normally be heard at the telephone of the recipient; and
   g) allowing the sound presentation to be heard by the caller or the recipient or both the telecommunication.

19. The method of presenting an advertising or promotional sound presentation of claim 18 further characterized in that said method comprises the reduction in the sound of a ringing signal and the generation of a sound presentation overlying that ringing signal.

20. The method of presenting an advertising or promotional sound presentation of claim 18 further characterized in that said method comprises elimination of the ringing signal and generation of a sound presentation in place of the ringing signal.

21. The method of presenting an advertising or promotional sound presentation of claim 18 further characterized in that said method comprises generating the sound presentation during a portion of or all of the normal quiescent period of time in which a ringing signal would be generated.

22. The method of presenting an advertising or promotional sound presentation of claim 18 further characterized in that the method causes the sound presentation to be generated at a telephone switching station for the caller or the recipient or both.

23. The method of presenting an advertising or promotional sound presentation of claim 18 further characterized in that the method causes the sound presentation to be generated at the telephone of the caller or the recipient or both.

24. The method of presenting an advertising or promotional sound presentation of claim 18 further characterized in that said method comprises introducing and storing information relating to the sound presentation to be generated and transmitted from a remote source.

25. The method of presenting an advertising or promotional sound presentation of claim 24 further characterized in that the method comprises:

(1) identifying the class of persons represented by the caller;

(2) thereafter identifying the category of sound presentations in which the sound presentation to be generated is contained; and (3) selecting one or more sound presentations to be generated from the selected category of sound presentation.

26. A software based algorithm for operation of a subscriber station enabling a sound presentation to be generated during a telephone ringing signal period in a telephone communication between a provider or provider-recipient and a caller, said software based algorithm comprising:

a) recognizing an attempt to initiate a telephone dialing by a caller to a recipient;

b) initiating a telephone call if the phone of the recipient is on hook;

c) issuing a code to a provider or provider-recipient from whom the caller may wish to purchase a product or service;

d) accessing a code of the provider or provider-recipient;

e) loading of a sound presentation appropriate to the caller and/or recipient or provider-recipient based on that code;

f) taking action to cause generation of a sound presentation during a ringing signal period to be heard by the caller or the recipient or both; and g) billing the recipient for the purchase of a product or service based on the presentation of the message.

27. The software based algorithm of claim 26 further characterized in that said algorithm comprises the step of obtaining data regarding the caller or the recipient or both by a subscriber station, processing the data and causing storage of same.

28. The software based algorithm of claim 26 further characterized in that said algorithm comprises the step of receiving information by a subscriber station from a remote source and using that information to add or revise sound presentations to be generated.

29. The software based algorithm of claim 26 further characterized in that said algorithm comprises the steps of receiving an order for a product or service from a provider, and processing the order by the subscriber station for the recipient or recipient-provider.

30. A software based algorithm for operation of a telephone system in which a sound presentation is heard and in which a caller can communicate with a provider delaying the ringing of a telephone of a recipient of the call, said algorithm comprising the steps of:

a) initiating those actions to allow a caller to dial a recipient's telephone;

b) taking actions to temporarily delay the initiation of a ringing signal at the recipient's telephone and/or any ring-back signal at the telephone of the caller;

c) introducing a sound presentation to be generated at the telephone of the caller during a portion of the ring-back signal;

d) initiating those actions to play the introduced sound presentation to the caller or the recipient or both;

e) allowing the ringing signal to progress to the recipient's telephone and terminating the playing of the sound presentation upon answering of the phone call by the recipient; and f) allowing for direct communication between the caller and a provider of a product or service independently of the recipient so that the caller can communicate directly with the provider.

31. The software based algorithm of claim 30 further characterized in that the algorithm comprises initiating those actions to select and identify a sound presentation category which contains the sound presentation to be generated, based on certain profile information relating to the caller, before playing of the introduced message.

32. The software based algorithm of claim 30 further characterized in that the algorithm comprises initiating those actions to generate a billing of the caller based on the telephone call between the caller and the provider.

33. A software based algorithm for operation of a telephone system in which a generated sound presentation replaces a ring-back signal normally heard in a caller's telephone and/or a ringing signal is heard at a recipient's telephone until such time as the recipient of a call answers the telephone call, said algorithm comprising the steps of:

a) initiating those actions to identify the class of persons represented by the caller;

b) introducing a sound presentation to be generated over the telephone which replaces a portion or all of the ring-back signal and/or the ringing signal;

c) locating sound presentation generating circuitry in the telephone of the caller or the recipient or both such that the sound presentation can be generated independently of the circuitry of a telephone circuit provider such that the sound presentation can be generated free of the normal charges of and the delays and congestion of the telephone circuit provider;

d) allowing the sound presentation generating circuitry to locate and provide a sound presentation appropriate to the caller or the recipient or both;

e) initiating those actions to play the introduced sound presentation to the caller or the recipient or both; and f) terminating the playing of the sound presentation upon answering of the phone call by the recipient.

34. The software based algorithm of claim 33 further characterized in that the algorithm causes initiating those actions to identify the status of the telephone line between the caller and the recipient.

35. The software algorithm of claim 34 further characterized in that:

a) determining whether the telephone line of the recipient telephone is busy; and b) terminating the telephone call and generating no sound presentation if the telephone line is busy and allowing for presentation of a sound presentation if the telephone line is not busy.

* * * * *